United States Patent
Ramamurthi et al.

(10) Patent No.: US 11,356,867 B1
(45) Date of Patent: Jun. 7, 2022

(54) MEC INTEGRATION WITH RAN FACILITIES

(71) Applicant: Verizon Patent and Licensing Inc., Basking Ridge, NJ (US)

(72) Inventors: Vishwanath Ramamurthi, San Ramon, CA (US); Jin Yang, Orinda, CA (US); Arda Aksu, Lafayette, CA (US); Donna L. Polehn, Mercer Island, WA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/100,665

(22) Filed: Nov. 20, 2020

(51) Int. Cl.
  *H04W 24/02* (2009.01)
  *H04W 88/18* (2009.01)
  *H04W 84/04* (2009.01)

(52) U.S. Cl.
  CPC ........... *H04W 24/02* (2013.01); *H04W 88/18* (2013.01); *H04W 84/042* (2013.01)

(58) Field of Classification Search
  CPC .... H04W 24/02; H04W 84/042; H04W 88/18
  See application file for complete search history.

(56) References Cited

U.S. PATENT DOCUMENTS

| | | | | |
|---|---|---|---|---|
| 2019/0335414 | A1* | 10/2019 | Rasanen | H04W 64/00 |
| 2020/0389531 | A1* | 12/2020 | Lee | H04L 61/1511 |
| 2021/0029589 | A1* | 1/2021 | Itoh | H04W 28/24 |

* cited by examiner

Primary Examiner — Wayne H Cai

(57) ABSTRACT

A Multi-access Edge Computing (MEC) device receives first parameters associated with a user device from a first radio access network (RAN) device. The MEC device performs functions associated with an application being executed by the user device and the MEC device is co-located with the RAN device. The MEC device receives second parameters associated with the user device from a core network device. The MEC device modifies performance of the functions based on the received first and second parameters and provides third parameters associated with the user device to a second RAN device that is co-located with the MEC device for adjusting performance of a network.

20 Claims, 5 Drawing Sheets

MEC INTEGRATION WITH RAN FACILITIES

BACKGROUND

New cellular networks (e.g., Fifth Generation (5G) networks) can provide various services and applications to user devices with optimized latency and quality of service. For example, the use of Multi-access Edge Computing (MEC) platforms (also referred to as Mobile Edge Computing platforms) with 5G networks allows high network computing loads to be transferred onto edge servers, which can minimize latency and reduce backhaul delay. A close interaction between a MEC platform and radio access network (RAN) nodes may enable a network to provide for better application performance.

DETAILED DESCRIPTION OF PREFERRED EMBODIMENTS

Figure 1:
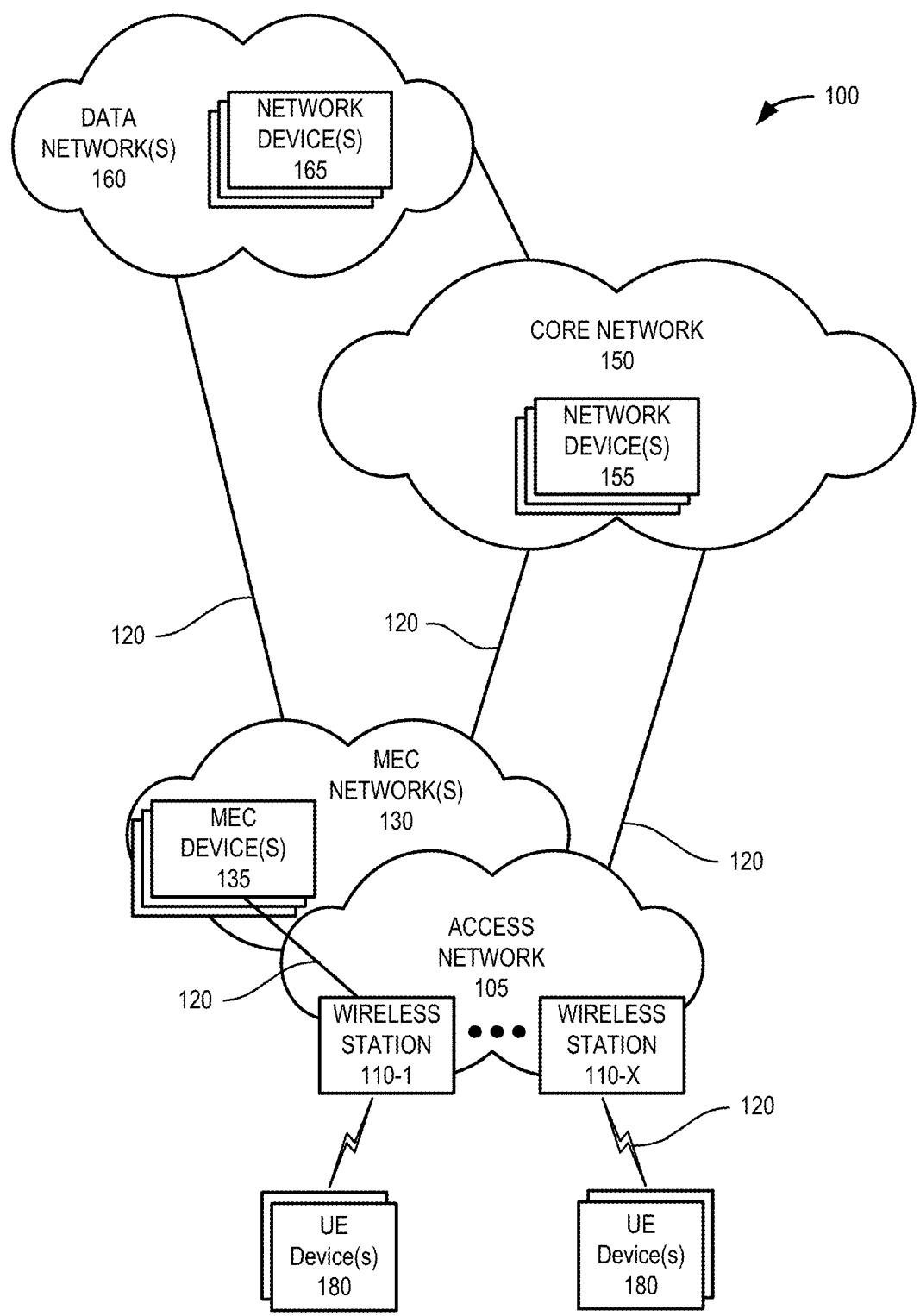
FIG. 1 is a diagram illustrating an exemplary environment in which an exemplary embodiment may be implemented.

The following detailed description refers to the accompanying drawings. The same reference numbers in different drawings may identify the same or similar elements. Also, the following detailed description does not limit the invention.

MEC technology may offer high speed, low latency computing for a variety of industries and applications including health care, telematics (e.g., autonomous vehicles), gaming, entertainment (e.g., virtual reality, augmented reality, etc.), industry automation, Internet of Things (IoT), computer vision, etc. MEC technology may deliver high throughput, low latency network services for applications.

In order to support low latency, information about users, user devices, user network resources, and network conditions may be constantly retrieved and available as data for the MEC platform to ingest in order to make decisions about how MEC applications function. In order to perform these actions dynamically and proactively, the MEC must have access to user information and network information.

Open RAN (O-RAN) Reference Architecture includes a non-real time RAN Intelligent Controller (RIC), a near-real-time RIC, various open interfaces (e.g., O1, A1, E2, open fronthaul interface, etc.), and interoperability with standard interfaces (e.g., Third Generation Partnership Project (3GPP) interfaces, such as F1, W1, E1, X2, Xn, etc. The control functionality of the non-real-time RIC relates to greater than about 1 second (>1 s) timeframe and the control functionality of the near-real-time MC relates to less than about 1 second (<1 s) timeframe. The hierarchical RICs may include machine learning (ML) models and/or artificial intelligence (AI) components that add intelligence to the RAN. The non-real-time RIC and the near-real-time RIC may gather information from other RAN nodes as well as from outside entities, such as the MEC platform.

A close interaction between a RAN node (e.g., a 3GPP node or an O-RAN node, such as a RIC) and a MEC platform may allow the MEC platform to provide services based on differing network conditions. Information received from a RAN node may change how a MEC platform operates. For example, the MEC platform may scale services up or down based on network conditions received from RAN nodes. As another example, the MEC platform may provide differing levels of video definition or resolution based on received network conditions. Co-locating RAN nodes and MEC platforms may reduce latency when providing services in varying network conditions. For example, co-locating RAN nodes and a MEC platform may allow the MEC platform to quickly change the way the MEC platform performs functions with respect to a user device when the user device is experiencing a different network condition.

Implementations described herein may provide for deploying MEC equipment alongside RAN equipment. For example, the RAN may expose an application programming interface (API) to allow the MEC platform to access RAN information in order to improve services provided by the MEC platform. The information accessed may vary based on the RAN node exposing the information and based on services provided by the MEC platform.

In one implementation, the MEC platform may provide information to RAN nodes that allows the RAN to perform self-organizing network (SON) operations. In addition, core elements may be deployed alongside the RAN nodes and the MEC platform to provide additional information to the MEC platform in order to optimize services provided by the MEC platform.

FIG. 1 illustrates an exemplary environment 100 that includes an access network 105, one or more MEC networks 130, a core network 150, and one or more data networks 160. Access network 105 may include wireless stations 110-1 through 110-X (referred to collectively as wireless stations 110 and generally as wireless station 110). MEC network 130 may include MEC devices 135; core network 150 may include network devices 155; and data networks 160 may include network devices 165. Environment 100 further includes multiple user equipment (UE) devices 180 (referred to herein collectively as UEs 180 and individually as UE 180).

The number, the type, and the arrangement of network devices and the number of UEs 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, and/or another type of computing architecture.

Environment 100 includes communication links 120 between the networks, between the network devices, and between UEs 180 and the network devices. Environment 100 may be implemented to include wired, optical, and/or wireless communication links among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a 5G radio access network (RAN), a Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include both eNBs and gNBs. In some implementations, wireless stations 110 may not support separate control plane and user plane signaling.

In other implementations, access network 105 may support separate control plane and user plane signaling. For example, a gNB may include multiple decomposed distributed components, such as a central unit (CU) with separate control plane and user plane functionality, a distributed unit (DU), a remote unit (RU) or a remote radio unit (RRU)), or another type of distributed arrangement. In other implementations, access network 105 may include open network devices (e.g., O-RAN Centralized Unit (O-CU), O-RAN Distributed Unit (O-DU), O-RAN next generation Node B (O-gNB), O-RAN evolved Node B (O-eNB, etc.), a future generation wireless access device, or another type of wireless node (e.g., a WiMax device, a hotspot device, etc.) that provides a wireless access service.

MEC network 130 (also referred to as an "application service layer network" or "edge network") may include a platform that provides application services, such as low latency services, at the edge of a network. For purposes of illustration and description, MEC devices 135 may include various types of network devices that may be resident in MEC network 130. MEC devices 135 may include variable compute configurations, including, without limitation, a central processing unit (CPU), a graphical processing unit (GPU), a field programmable gate array (FPGA), etc. MEC devices 135 may also include devices to perform orchestration and containerization functions. MEC devices 135 may be located to provide geographic proximity to various groups of wireless stations 110. In some embodiments, MEC devices 135 may be co-located with a wireless station 110 or with a component of a wireless station (e.g., a control unit of a gNB). In other embodiments, wireless stations 110 may connect to MEC network 130 via wired (e.g., optical) backhaul links 120. In other embodiments, MEC devices 135 may be co-located with elements of access network 105 and/or core network 150. As used herein, the term "co-located" may refer to elements that are located within the same platform or subsystem of environment 100.

MEC network 130 may be implemented using one or multiple technologies including, for example, network function virtualization (NFV), software defined networking (SDN), cloud computing, webscale, or another type of network technology. Depending on the implementation, MEC network 130 may include, for example, virtualized network functions (VNFs), containerized network functions (CNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Core network 150 may include one or multiple networks of one or multiple network types and technologies. For example, core network 150 may be implemented to include an Evolved Packet Core (EPC) of an LTE network, an LTE-A network, an LTE-A Pro network, a Next Generation Core (NGC), a 5G Core Network (5GC) for a 5G network and/or a legacy core network. According to one implementation, core network 150 may include a non-standalone (NSA) core network to support dual coverage using 4G and 5G networks, referred to as interoperability Option 3x, or other 3GPP defined NSA-based architecture options. Core network 150 may manage communication sessions for UEs 180. For example, core network 150 may establish an Internet Protocol (IP) connection between a UE 180 and a MEC device 135 in a particular MEC network 130 location. Furthermore, core network 150 may enable UE 180 to communicate with an application server or another type of network device 165 located in a particular data network 160.

Depending on the implementation, core network 150 may include various network elements that may be implemented in network devices 155. Such network elements may include a mobility and management entity (MME), a user plane function (UPF), a session management function (SMF), a core access and mobility management function (AMF), a unified data management (UDM), a packet data network (PDN) gateway (PGW), a serving gateway (SGW), a policy charging rules function (PCRF), a policy function (PCF), a policy control, a home subscriber server (HSS), as well other network elements pertaining to various network-related functions, such as billing, security, authentication and authorization, network polices, subscriber profiles, network slicing, and/or other network elements that facilitate the operation of core network 150. In the context of a core network that is configured to support 5G UE devices 180, core network 130 may include one or more network devices 155 with combined 4G and 5G functionality, such as a session management function with PDN gateway-control plane (SMF+PGW-C) and a user plane function with PDN gateway-user plane (UPF+PGW-U).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices 165 that provide various applications, services, or other type of user device assets (e.g., servers (e.g., web, application, cloud, etc.), mass storage devices, data center devices), and/or other types of network services pertaining to various network-related functions.

UEs 180 may each include a mobile device, such as wireless or cellular telephone device (e.g., a conventional cell phone with data processing capabilities), a smart phone, a personal digital assistant (PDA) that can include a radio-telephone, etc. In other implementations, UEs 180 may be implemented as a machine-type communications (MTC) device, an Internet of Things (IoT) device, a machine-to-machine (M2M) device, etc., that includes communication functionality, such as a home appliance device, a home monitoring device, a surveillance camera, a medical monitoring device, etc. In another implementation, UEs 180 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. As described further herein, UEs 180 or applications running on UEs 180 may be configured for certain types of communications in network environment 100. For example, UEs 180 may be associated with an identifier such as a network slice selection assistance information (NSSAI) that governs particular types of network traffic, such as traffic designated for MEC-based services.

Figure 2:
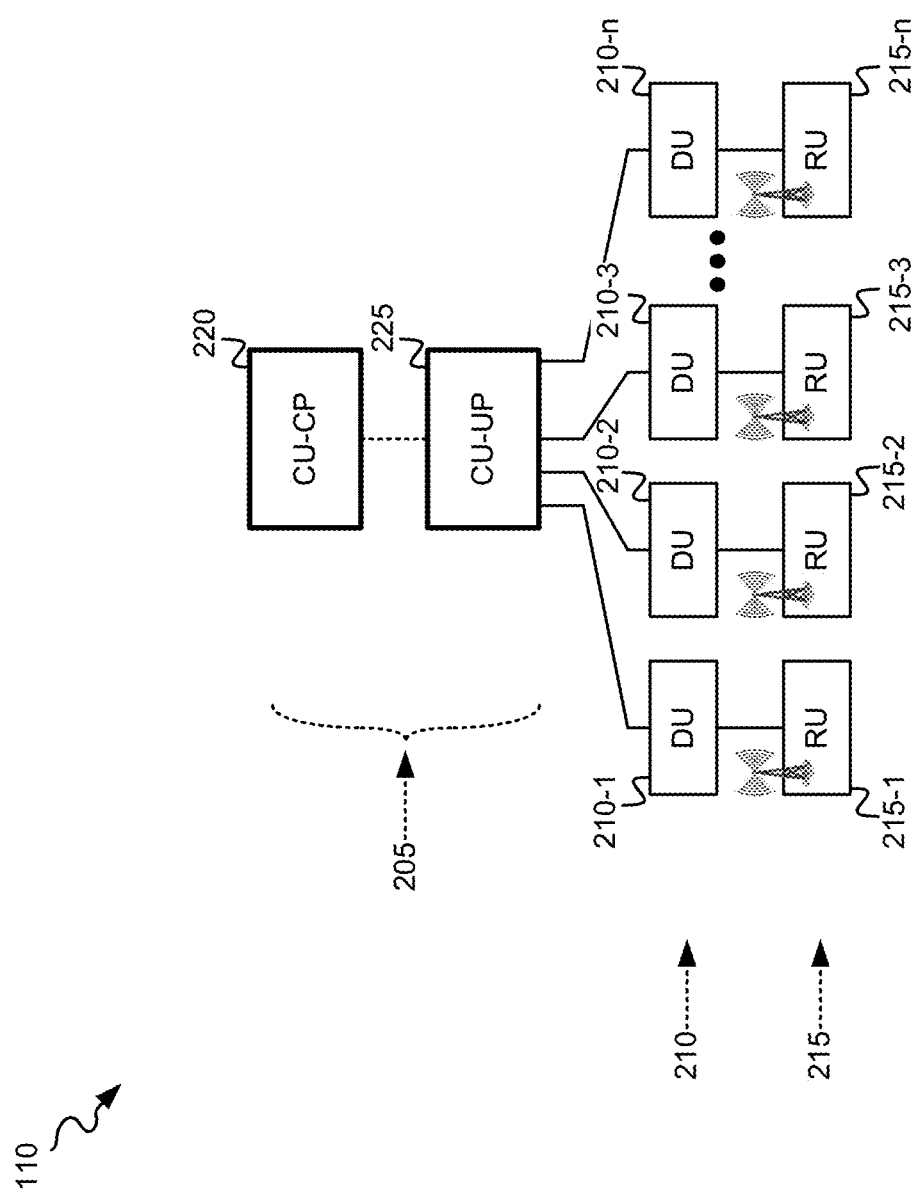
FIG. 2 is a diagram illustrating an exemplary embodiment of a system depicted in FIG. 1.

FIG. 2 illustrates an exemplary wireless station 110 of a wireless network in environment 100. The wireless station 110 may, in one implementation, include a New Radio (NR) Next Generation gNB used in the RAN of a Next Generation mobile network, such as, for example, a 5G mobile network. Wireless station 110 may include a central unit CU 205, at least one DU 210, and at least one RU 215. As shown, CU 205 may be divided into two subcomponents: a CU-Control Plane (CP) component 220 (referred to herein as "CU-CP 220") and a CU-User Plane (UP) component 225 (referred to herein as "CU-UP 225"). The CU-CP 220 includes a logical node that hosts Radio Resource Control (RRC), and other control plane functions (e.g., Service Data Adaptation Protocol (SDAP), and Packet Data Convergence Protocol (PDCP)).

The CU-UP 225 includes a logical node that hosts user plane functions, such as, for example, data routing and transport functions. CU-CP 220 and CU-UP 225 of CU 205 may include distributed nodes that may be located remotely from one another and multiple distributed CU-CP 220s and/or multiple CU-UPs 225 may be positioned at different locations within a network. A selected one of the CU-CPs 220 and a selected one of the CU-UPs 225 may be used for handling traffic from one or more UEs 180.

The DU 210 of wireless station 110 may, in some implementations, include multiple DUs 210-1 through 210-n, where n is equal to or greater than 2. Each DU 210 of the multiple DUs 210 includes a logical node that hosts functions associated with the Radio Link Control layer, the Media Access Control (MAC) layer, and the physical layer (PHY). The RU 215 may include multiple RUs 215-1 through 215-n. Each RU 215 may include at least one radio transceiver, and associated antenna(s), for radio frequency wireless communication with one or more UEs 180 (not shown). Each DU 210 connects to a RU 215. For example, each DU 210 of the multiple DUs 210-1 through 210-n connects to a respective one of RUs 215-1 through 215-n (e.g., DU 210-1 connects to RU 215-1, DU 210-2 connects to RU 215-2, etc.).

CU 205 controls the transport of data (e.g., data packets) received at a RU 215 via wireless RF transmissions from a UE 180, and controls the transport of data from the wireless network to a DU 210 and RU 215 for wireless transmission to a destination UE 180.

Figure 3:
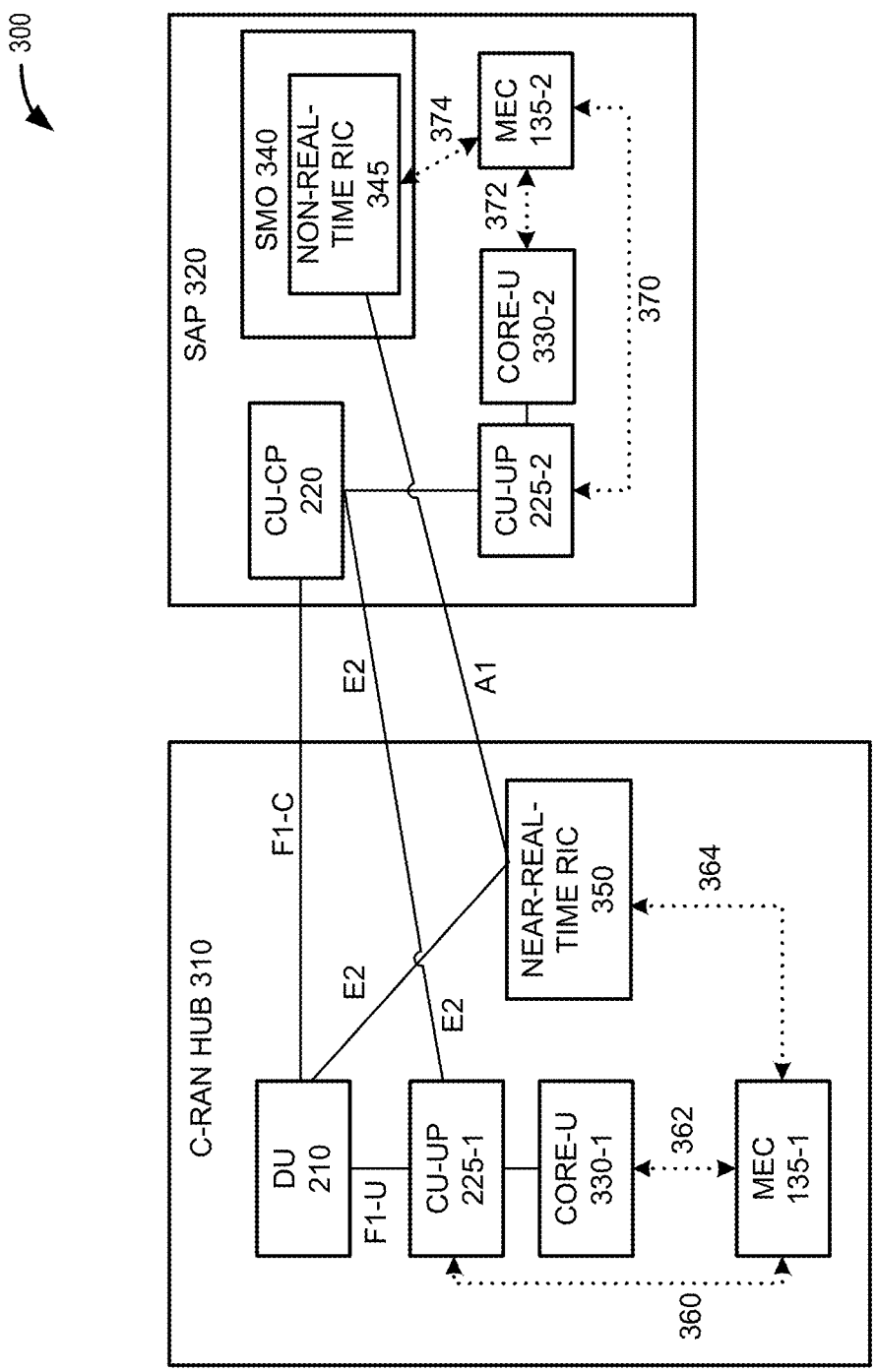
FIG. 3 is a diagram illustrating another exemplary environment in which an exemplary embodiment of the system may be implemented.

FIG. 3 is a diagram illustrating an environment 300 in which an exemplary embodiment of MEC integration with RAN nodes may be implemented. As illustrated, environment 300 includes a centralized-RAN (C-RAN) hub 310 and a Service Aggregation Point (SAP) 320. C-RAN hub 310 includes DU 210, CU-UP 225-1, Core-U 330-1, near-real-time RIC 350, and MEC device 135-1. SAP 320 includes CU-CP 220, CU-UP 225-2, Core-U 330-2, Service Management and Orchestration (SMO) device 340 (referred to herein as SMO 340) including non-real-time RIC 345, and MEC device 135-2. Core-U 330-1 and 330-2 may correspond to elements or devices in core network 150. As shown in FIG. 3, DU 210, CU-UP 225-1, Core-U 330-1, near-real-time RIC 350, and MEC device 135-1 are co-located within C-RAN hub 310. In addition, CU-CP 220, CU-UP 225-2, Core-U 330-2, SMO device 340, and MEC device 135-2 are co-located within SAP 320.

The elements described in FIG. 3 are exemplary and different elements may be provided in C-RAN hub 310 and SAP 320 in other implementations. In addition, the locations of MEC devices 135-1 and 135-2 may vary depending on a number of factors, such as a type of application being executed, types of network conditions identified, etc.

When a MEC device is at the position shown by MEC device 135-1, MEC device 135-1 may exchange information with CU-UP 225-1 via link 360, Core-U 330-1 via link 362, and near-real-time RIC 350 via link 364. For example, MEC device 135-1 may receive information from and transmit information to CU-UP 225-1, Core-U 330-1, and near-real-time RIC 350 via links 360, 362, and 364, respectively. In order to access information from different control and RAN nodes, APIs associated with the control and RAN nodes may be exposed to allow the MEC to access specific RAN information. Similarly, in order to allow information to be accessed by control and RAN nodes, the MEC API may be exposed to allow particular information to be exchanged.

As shown in FIG. 3, MEC device 135-1 may receive information identifying current network conditions from CU-UP 225-1. The information received may be on a per user basis, a per radio bearer basis, or on another basis. In one implementation, CU-UP 225-1 may provide information regarding radio conditions associated with UE 180 to MEC device 135-1 via link 360. For example, if MEC device 135-1 is performing a function associated with interactive gaming or video streaming at UE 180, MEC device 135-1 may receive information indicating buffer status, signal strength, interference, latency, packet loss, jitter, or additional conditions associated with UE 180 from CU-UP 225-1. Based on the received radio conditions, MEC device 135-1 may take different actions with regard to an application being executed at UE 180, such as scaling the radio quality up or down, changing a definition associated with a video (e.g., high definition, standard definition), deploying techniques to optimize Transmission Control Protocol (TCP), etc.

In one implementation, MEC device 135-1 may receive additional information from Core-U 330-1 over link 362. For example, Core-U 330-1 may provide subscription information associated with UE 180 (e.g., information regarding a level of service UE 180 is subscribed to, whether UE 180 has guaranteed quality of service (QoS), etc.) to MEC device 135-1. As another example, Core-U 330-1 may provide information for performing TCP optimization to MEC 135-1. MEC device 135-1 may alter the way it operates or performs functions associated with an application being executed at UE 180 based on receiving input from CU-UP 225-1 and Core-U 330-1.

In another implementation, MEC device 135-1 may provide information to CU-UP 225-1 and Core-U 330-1. For example, MEC device 135-1 may provide information to CU-UP 225-1 and Core-U 330-1 requesting prioritized treatment for certain user bearer/slices over other user bearer/slices. As another example, MEC device 135—may additionally communicate QoS and/or quality of experience (QoE) requirements associated with a user's slice dynamically to CU-UP 225-1, Core-U 330-1, and/or to other network nodes.

In another implementation, MEC device 135-1 may provide information received from CU-UP 225-1 and/or Core-U 330-1 to near-real-time RIC 350. Near-real-time RIC 350 may improve network performance by utilizing closed loop measurements to optimize load, energy consumption, or other parameters across multiple RANs. Near-real-time RIC 350 may receive the information from MEC device 135-1 and may set quality settings for UE 180 based on the parameters received from MEC device 135-1. Since the API bus is a two-way API, MEC device 135-1 may provide information to the RAN elements (e.g., near-real-time RIC 350) that allows the RAN to perform SON operations. As shown in FIG. 3, MEC device 135-1 may additionally transmit information to CU-UP 225-1 and Core-U 330-1 via links 360 and 362, respectively.

For example, if UE 180 is executing an application in a poor radio network condition, attempting to send more packets from core network 150 to UE 180 may result in a buffer overflow at wireless station 110 or packets getting dropped, which may result in a potential TCP timeout and the application re-sending the packets. If MEC 130-1 is performing functions relating to the application, MEC 130-1 may receive radio conditions associated with UE 180 from CU-UP 225-1 and additional information from Core-U 330-1 and may adjust parameters based on the received information. In addition, MEC 130-1 may transmit information associated with the radio network or parameters associated with the application being executed by UE 180 to other RAN nodes (e.g., near-real-time RIC 350) or core network nodes and the RAN nodes or core network nodes may use the information to optimize performance of the network.

In a similar manner, if the MEC device is in the position of MEC device 135-2, MEC device 135-2 may receive network conditions associated with UE 180 from CU-UP 225-2 via link 370 and information associated with UE 180 (e.g., user information, subscription information, network information, etc.) from Core-U 330-2 via link 372 and may use the information to modify services provided in association with an application being executed on UE 180. MEC device 135-2 may further provide information (e.g., information received from CU-UP 225-2 or Core-U 330-2, information relating to parameters associated with the application being executed on UE 180, or other information) to non-real-time RIC 345. In one implementation, non-real-time RIC 345 may transmit the information to near-real-time MC 350 via the A1 interface. Near-real-time MC 350 may use the information to optimize performance of the network.

Integrating the MEC device 135 with RAN nodes may be useful in a number of situations. In one example, MEC device 135 may host a dynamic website for an e-commerce customer and MEC device 135 may dynamically tailor the website content based on RAN channel conditions. For example, if a user accessing the e-commerce website has a high channel quality indicator (CQI) and congestion is low, MEC device 135 may be able to immediately present higher density content, such as multimedia or augmented reality (AR) content, and may begin to present the higher density content without buffering, which may provide a faster and more responsive experience for the user.

As another example, if the user accessing the e-commerce website is experiencing a poor channel condition (e.g., a low CQI and/or high congestion), MEC device 135 may dynamically alter the content for lighter media, such as static images, small animations, etc. In this example, if the user wishes to access richer content, the user may request the higher density content by clicking on an item. Clicking on the item may result in the user receiving a warning that, due to the signal condition, the user experience may be slow.

A knowledge of current RAN channel conditions may be valuable to many companies, such as e-commerce companies, because analytics show that every additional second it takes to load a webpage may equal a particular amount of lost revenue. A company may choose to spend money to improve a network in order to improve network performance and page views among customers. In one example, a bus interface (e.g., Kafka or Pulsar) may be provided to a MEC service provider (e.g., associated with an e-commerce company) and the MEC service provider may be able to stream real time parameters associated with a customer or network, such as CQI, Reference Signal Receive Power (RSRP), geographic location, timing advance (TA) distance, round trip delay (RTD), etc. Alternatively or in addition, a basic content determination factor may be computed for the provider. If the company has high value customers, based on the received real time parameters, a telecommunications company may be able to divert RAN resources to a virtualized cloud platform, which may be used to anticipate demand and feed into a real time SON to provide customers with a better service and user experience.

In one implementation, applications running on a MEC device 135 that is co-located with RAN nodes may receive different treatment than applications running on a MEC device 135 that is located in a different location even if applications belong to the same network slice (e.g., a MEC specific RAN slice). For example, due to latency and additional factors, the RAN may treat applications running on a MEC device 135 that is co-located with RAN nodes differently than applications running on a MEC device 135 that is located at, for example, MEC network 130, at a cloud MEC, or at another location that is not co-located with the RAN nodes.

Figure 4:
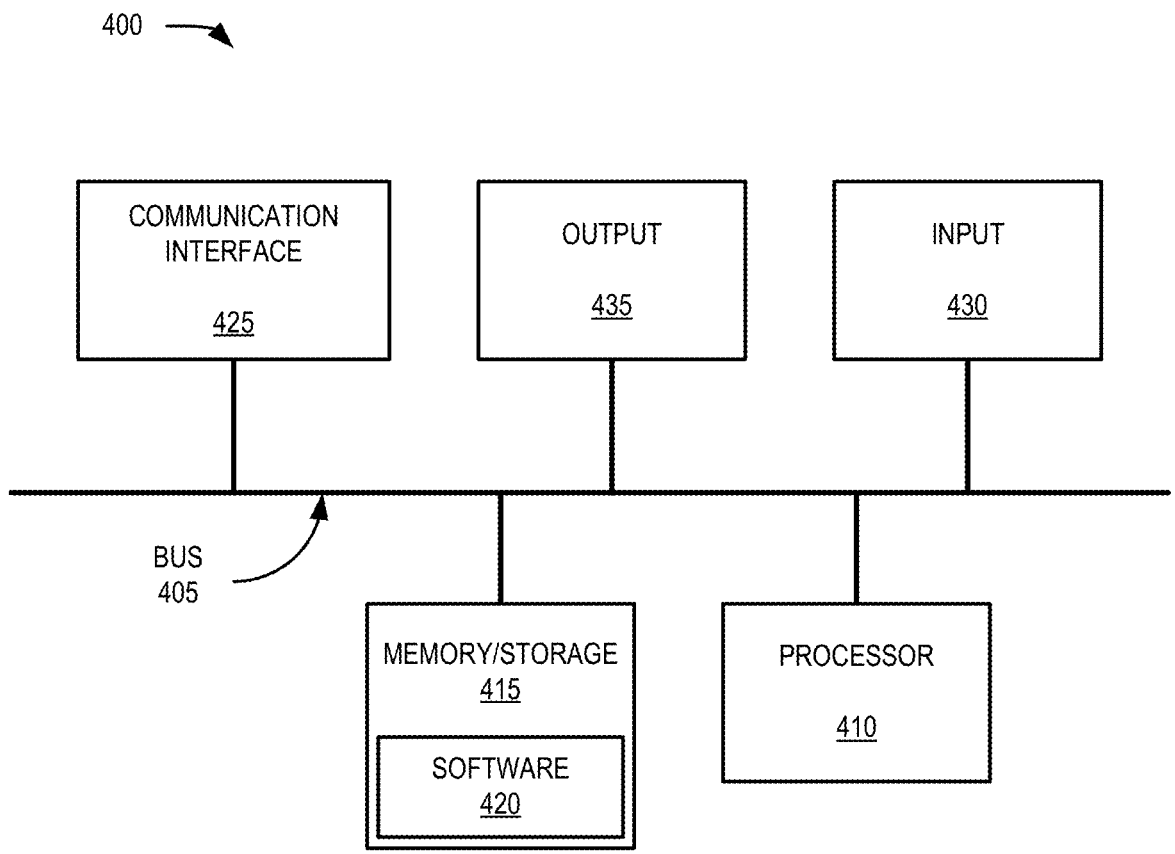
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to elements of wireless station 110 (e.g., CU-CP 220, CU-UP 225, DU 210, RU 215, etc.), MEC device 135, network device 155, UE 180, near-real-time RIC 350, non-real-time RIC 345, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers (e.g, RF transceivers). Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., MEC network 130) and/or another type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
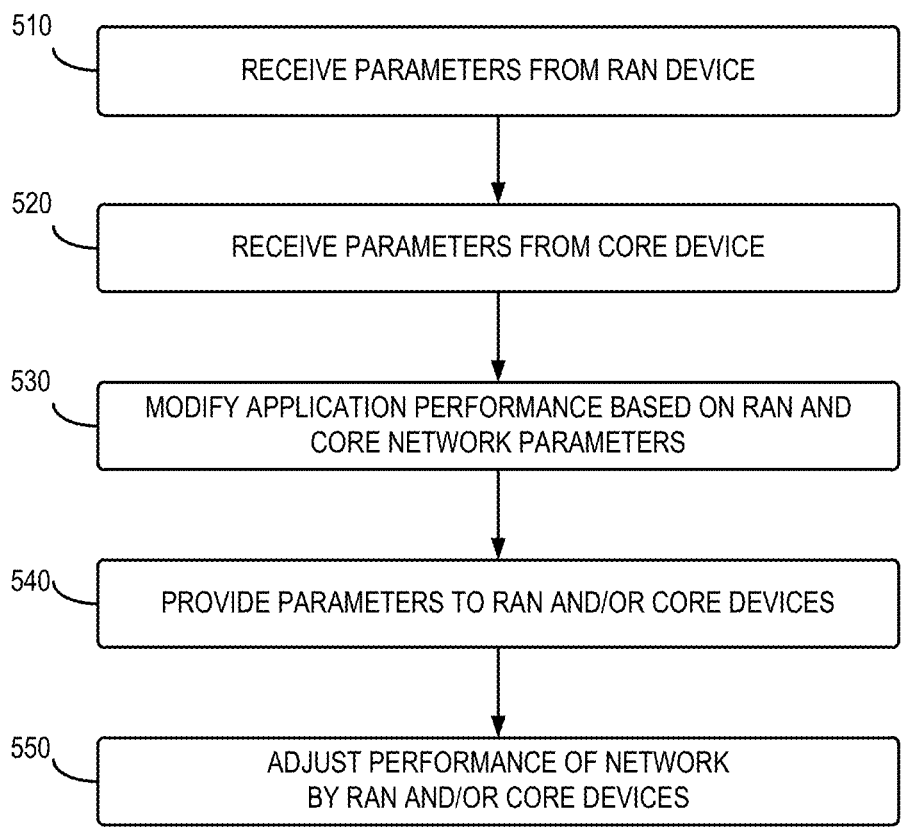
FIG. 5 is a flow diagram illustrating an exemplary process of an exemplary embodiment of the MEC integration with RAN facilities.

FIG. 5 is a flow diagram illustrating an exemplary process 500 of an exemplary embodiment associated with integrating a MEC platform with RAN facilities. According to an exemplary embodiment, MEC device 135, CU-UP 225, Core-U 330, non-real-time RIC 345, near-real-time RIC 350, and/or other elements of FIGS. 1, 2, and 3 may perform the steps of process 500. According to an exemplary implementation, processor 410 executes software 420 to perform a step of process 500, as described herein. Alternatively, a step may be performed by execution of only hardware.

Process 500 may begin by MEC device 135 receiving parameters from a RAN device (block 510). For example, MEC device 135 may be performing a function associated with an application being executed by UE 180 and MEC device 135 may receive parameters associated with network conditions relating to UE 180. In one implementation, MEC device 135 may be co-located with the RAN device (i.e., MEC device 135 may be located in close proximity to the RAN device, such as C-RAN hub 310). In one implementation, the RAN device may expose its API to allow MEC device 135 to access the parameters associated with, for example, network conditions. The information exposed that is may vary based on the type of RAN device exposing the information. For example, CU-UP 225 may expose certain information and/or parameters and DU 210 may expose different information and/or parameters. In one example, the RAN device may correspond to CU-UP 225, DU 210, or another RAN device. The parameters received from the RAN device may include, for example, radio conditions associated with UE 180, such as buffer status, signal strength, interference, jitter, packet loss, delay/latency, or other network conditions.

Process 500 may continue by MEC device 135 receiving parameters from a core network device (block 520). For example, MEC device 135 may be located in close proximity to a core network device (e.g., one of network devices 155) and MEC device 135 may receive parameters associated with UE 180 from the core network device. The parameters received from the core network device may include, for example, subscription information associated with a user at UE 180, information for TCP optimization, etc.

MEC device 135 may modify performance of the function associated with the application being executed by UE 180 based on the received parameters (block 530). For example, MEC device 135 may take different actions based on the network conditions being experienced by UE 180. In one example, MEC device 135 may change the definition (e.g., resolution) of video being transmitted to UE 180 based on conditions experienced by UE 180. For example, if UE 180 is in an area with poor RAN channel conditions, MEC device 135 may present lower resolution/definition images. If, on the other hand, UE 180 is experiencing high channel quality and low congestion, MEC device 135 may present higher resolution/definition images or higher density content (such as multimedia, augmented reality, etc.).

MEC device 135 may additionally provide parameters associated with UE 180 to RAN devices and/or core network devices (block 540). For example, the API of MEC device 135 may be exposed to allow RAN devices and/or core devices to access information. The information may include, for example, information associated with the application being executed by UE 180 and/or information about a subscriber associated with UE 180. For example, MEC device 135 may provide information about the quality settings for particular applications being executed by UE 180 or a quality of service that is to be set for a particular video based on network conditions. In one example, MEC device 135 may provide parameters to non-real-time RIC 345 and/or near-real-time RIC 350.

The performance of the network may be adjusted based on the parameters provided by MEC device 135 (block 550). For example, non-real-time RIC 345 and/or near-real-time RIC 350 may receive quality parameters from MEC 135 and non-real-time RIC 345 and/or near-real-time RIC 350 may set quality of service conditions at, for example, a slice level, a user group level, a UE 180 level, etc. In one example, MEC device 135 may provide information associated with radio conditions associated with UE 180 and co-located core network devices (e.g., network devices 155) may use the information to optimize packet processing (e.g., TCP optimization, video optimization, rate limiting, etc.). As another example, MEC device 135 may transmit information associated with RAN conditions and RAN resources may be diverted or redirected through a SON to improve a customer's quality of service and user experience.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of communications have been described with regard to FIG. 3 and series of blocks have been described with regard to the processes illustrated in FIG. 5, the order of the communications and blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, at a Multi-access Edge Computing (MEC) device and from a first radio access network (RAN) device, first parameters associated with a user device, wherein the MEC device performs functions associated with an application being executed by the user device, and wherein the MEC device is co-located with the RAN device;
receiving, at the MEC device and from a core network device, second parameters associated with the user device;
modifying, by the MEC device, execution of the functions based on the received first and second parameters; and
providing, by the MEC device, third parameters associated with the user device to a second RAN device for adjusting performance of a network, wherein the second RAN device is co-located with the MEC device.

2. The method of claim 1, wherein the second RAN device includes a RAN Intelligent Controller (RIC).

3. The method of claim 1, wherein the first parameters include RAN conditions associated with the user device.

4. The method of claim 3, wherein the RAN conditions include at least one of buffer status, a signal strength, interference information, delay information, or packet loss information.

5. The method of claim 1, wherein providing the third parameters includes exposing an Application Programming Interface (API) to allow the third parameters to be accessed by the second RAN device.

6. The method of claim 1, wherein the first RAN device includes a central unit (CU) device.

7. The method of claim 1, wherein the second parameters include subscription information associated with the user device.

8. A Multi-access Edge Computing (MEC) device comprising:
one or more processors configured to:
receive, from a first radio access network (RAN) device, first parameters associated with a user device, wherein the MEC device performs functions associated with an application being executed by the user device, and wherein the MEC device is co-located with the RAN device;
receive, from a core network device, second parameters associated with the user device;
modify execution of the functions based on the received first and second parameters; and
provide third parameters associated with the user device to a second RAN device for adjusting performance of a network, wherein the second RAN device is co-located with the MEC device.

9. The MEC device of claim 8, wherein the second RAN device includes a RAN Intelligent Controller (RIC).

10. The MEC device of claim 8, wherein the first parameters include RAN conditions associated with the user device.

11. The MEC device of claim 10, wherein the RAN conditions include at least one of buffer status, a signal strength, interference information, delay information, or packet loss information.

12. The MEC device of claim 8, wherein, when providing the third parameters, the one or more processors are configured to expose an Application Programming Interface (API) to allow the third parameters to be accessed by the second RAN device.

13. The MEC device of claim 8, wherein the first RAN device includes a central unit (CU) device.

14. The MEC device of claim 8, wherein the second parameters include subscription information associated with the user device.

15. A non-transitory computer-readable medium containing instructions, the instructions comprising one or more instructions that, when executed by a processor of a Multi-access Edge Computing (MEC) device, cause the processor to:
receive, from a first radio access network (RAN) device, first parameters associated with a user device, wherein the MEC device performs functions associated with an application being executed by the user device, and wherein the MEC device is co-located with the RAN device;
receive, from a core network device, second parameters associated with the user device;
modify performance of the functions based on the received first and second parameters; and
provide third parameters associated with the user device to a second RAN device for adjusting performance of a network, wherein the second RAN device is co-located with the MEC device.

16. The non-transitory computer-readable medium of claim 15, wherein the second RAN device includes a RAN Intelligent Controller (RIC).

17. The non-transitory computer-readable medium of claim 15, wherein the first parameters include RAN conditions associated with the user device.

18. The non-transitory computer-readable medium of claim 17, wherein the RAN conditions include at least one of buffer status, a signal strength, interference information, delay information, or packet loss information.

19. The non-transitory computer-readable medium of claim 15, wherein the one or more instructions that cause the processor to provide the third parameters comprise one or more instructions that cause the processor to expose an Application Programming Interface (API) to allow the third parameters to be accessed by the second RAN device.

20. The non-transitory computer-readable medium of claim 15, wherein the first RAN device includes a central unit (CU) device.

* * * * *